United States Patent
Meyer

(10) Patent No.: US 6,494,404 B1
(45) Date of Patent: Dec. 17, 2002

(54) PASSENGER AIRPLANE CONTAINER SYSTEM

(76) Inventor: John C. Meyer, 32 Southwind Dr., Belleair Bluffs, FL (US) 33770

( * ) Notice: Subject to any disclaimer, the term of this patent is extended or adjusted under 35 U.S.C. 154(b) by 0 days.

(21) Appl. No.: 09/929,695

(22) Filed: Aug. 14, 2001

(51) Int. Cl.[7] .............................. B64C 1/00; B64C 1/22; B64C 1/14

(52) U.S. Cl. ................................ 244/118.2; 244/118.1; 244/118.5; 244/118.6; 244/125; 244/127; 244/120; 244/137.1

(58) Field of Search ........................ 244/118.1, 118.2, 244/118.5, 118.6, 125, 127, 120, 137.1

(56) References Cited

U.S. PATENT DOCUMENTS

| | | | | |
|---|---|---|---|---|
| 1,760,061 A | * | 5/1930 | Horni ........................ 244/140 |
| 1,895,256 A | * | 1/1933 | Love ........................ 244/147 |
| 2,066,810 A | * | 1/1937 | Van Meter, Jr. ............. 244/87 |
| 2,120,477 A | * | 6/1938 | Adams ....................... 244/140 |
| 2,121,670 A | * | 6/1938 | Saives ....................... 244/120 |
| 2,388,380 A | * | 11/1945 | Bathurst ..................... 220/1.5 |
| 2,407,774 A | * | 9/1946 | Fowler ....................... 220/1.5 |
| 2,448,862 A | * | 9/1948 | Conklin .................. 244/118.2 |
| 2,472,947 A | * | 6/1949 | Hlobil ..................... 244/118.5 |
| 2,985,413 A | * | 5/1961 | Von Beckh Widmanstetter 244/140 |
| 3,028,130 A | * | 4/1962 | Burton .................... 244/118.2 |
| 3,102,607 A | * | 9/1963 | Roberts ........................ 186/40 |
| 3,396,820 A | * | 8/1968 | Kenny .......................... 186/40 |
| 3,589,490 A | * | 6/1971 | Walkhoff et al. ......... 193/35 R |
| 3,595,407 A | * | 7/1971 | Muller-Kuhn et al. ... 244/137.1 |
| 3,615,003 A | * | 10/1971 | Rust ............................. 186/40 |
| 3,756,546 A | * | 9/1973 | Carson et al. .......... 244/138 R |
| 3,978,995 A | * | 9/1976 | Zollinger et al. ........ 244/137.1 |
| 3,999,630 A | * | 12/1976 | McPhee ....................... 186/40 |
| 4,043,524 A | * | 8/1977 | Dreyer et al. .................. 206/3 |
| 4,218,034 A | * | 8/1980 | Magill .................... 244/114 R |
| 4,379,533 A | * | 4/1983 | Caldwell et al. ......... 244/118.1 |
| 4,508,296 A | * | 4/1985 | Clark ...................... 244/118.1 |
| 4,699,336 A | * | 10/1987 | Diamond .................... 244/140 |
| 4,860,974 A | * | 8/1989 | Barnett et al. ........... 244/118.1 |
| 5,031,860 A | * | 7/1991 | Ruiz et al. ............... 244/118.5 |
| 5,110,071 A | * | 5/1992 | Hunter et al. ............ 244/137.3 |
| 5,286,157 A | * | 2/1994 | Vainio et al. ............ 244/137.1 |
| 5,297,761 A | * | 3/1994 | Kendall et al. .......... 244/118.5 |
| 5,356,097 A | * | 10/1994 | Chalupa ................. 244/100 A |
| 5,388,955 A | * | 2/1995 | Schroder ..................... 414/267 |
| 5,716,026 A | * | 2/1998 | Pascasio et al. ............. 105/315 |
| 5,921,504 A | * | 7/1999 | Elizondo .................... 244/120 |
| 6,102,332 A | * | 8/2000 | Haxton et al. ........... 244/118.2 |

* cited by examiner

Primary Examiner—Charles T. Jordan
Assistant Examiner—Stephen A Holzen

(57) ABSTRACT

A passenger airplane container system comprises a pod. The pod has a hollow generally cylindrical configuration. The pod further has a horizontal divider. The horizontal divider separates the pod into a passenger area and a baggage area. An airplane is provided. The airplane has a central pod receiving region with a closure device. The closure device is movable between an open orientation and a closed orientation. The open orientation so allows for the movement of a pod into the receiving region. The closed orientation securely encompasses the pod. In this manner the pod is securely contained for takeoff and flight and landing.

9 Claims, 4 Drawing Sheets

PASSENGER AIRPLANE CONTAINER SYSTEM

BACKGROUND OF THE INVENTION

1. Field of the Invention

The present invention relates to a passenger airplane container system and more particularly pertains to allowing a passenger airplane to be loaded and unloaded in a safe and efficient manner.

2. Description of the Prior Art

The use of loading and unloading airplanes through known methods and apparatuses is known in the prior art. More specifically, loading and unloading airplanes through known methods and apparatuses previously devised and utilized for the purpose of loading and unloading airplanes through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,143,841 to Roeder discloses an aircraft breakaway cabin section. U.S. Pat. No. 4,358,072 to Williamson discloses a land vehicle and aircraft combination. U.S. Pat. No. 5,009,374 to Manfredi et al discloses an aircraft with releasable wings. Lastly, U.S. Pat. No. 5,421,539 to Carducci discloses a cargo conversion system for passenger aircraft.

While these devices fulfill their respective, particular objectives and requirements, the aforementioned patents-do not describe a passenger airplane container system that allows allowing a passenger airplane to be loaded and unloaded in a safe and efficient manner.

In this respect, the passenger airplane container system according to the present invention substantially departs from the conventional concepts and designs of the prior art, and in doing so provides an apparatus primarily developed for the purpose of allowing a passenger airplane to be loaded and unloaded in a safe and efficient manner.

Therefore, it can be appreciated that there exists a continuing need for a new and improved passenger airplane container system which can be used for allowing a passenger airplane to be loaded and unloaded in a safe and efficient manner. In this regard, the present invention substantially fulfills this need.

SUMMARY OF THE INVENTION

In view of the foregoing disadvantages inherent in the known types of loading and unloading airplanes through known methods and apparatuses now present in the prior art, the present invention provides an improved passenger airplane container system. As such, the general purpose of the present invention, which will be described subsequently in greater detail, is to provide a new and improved passenger airplane container system and method which has all the advantages of the prior art and none of the disadvantages.

To attain this, the present invention essentially comprises a pod. The pod is fabricated of a rigid metallic material. The pod has a hollow generally cylindrical configuration. The pod also has an exterior surface and an interior surface. The pod further has an enlarged chamber within the interior surface. The pod has a horizontal divider. The horizontal divider separates the enlarged chamber into an upper passenger area and a lower baggage area. These could be reversed with passengers lower and baggage upper. The upper passenger area is within the chamber and above the divider. The lower baggage area is within the chamber and below the divider. A plurality of passenger windows is formed in the pod. The windows are doors are laterally spaced within the passenger area. The pod has two end covers. Each end cover has a door. The door is located in the center of the end covers. To facilitate rapid passenger ingress and egress, each set of three seats in this example, or more for wider body aircraft, has open access from the side. This arrangement is similar to shuttle trams at theme parks. After landing and the pod is delivered to the terminal building, all passengers may disembark almost simultaneously. Similarly, baggage doors are on each side under each row of seats. Each bag stays with each passenger. In addition, the seats are preferably staggered up and down to provide more leg room and more seat recline area for comfort of all passengers. The interior of the pod has a plurality of passenger seats at alternating elevations. The interior of the pod further has a passenger walkway between the seats. Provided next is a movable self-service module. The self-service module has an associated supporting track. The associated supporting track is on the uppermost extent of the pod in the passenger area. This arrangement allows passengers to help themselves to drinks and snacks. Coupling components are provided. The self-service module coupling components are slidably mounted to the service module on the track. In this manner the service module is allowed to be moved along the length of the upper passenger area. Next provided is a stacking structure. The stacking structure has a plurality of horizontal bays. Each bay is adapted to removably receive a pod. The passenger pods are loaded and unloaded with passengers and baggage. The stacking structure has a plurality of horizontal airplane parking zones. The horizontal airplane parking zones are beneath the horizontal bays. The stacking structure also has a plurality of vertical loading chutes. In this manner the raising and lowering of a pod between the horizontal bays and the parking zones is allowed. The opening in the airplane could be at any access area such as the top or the bottom or the front or the rear. The loading chutes could thus be horizontal as well as vertical to facilitate use in alternative structures and airports, including present airports and regional airports and restricted airports. Lastly provided is an airplane. The airplane has an upper surface and a lower surface. The airplane also has two side surfaces. The airplane further has a forward fuselage section and a rear tail fuselage section. A central bay fuselage section is provided between the forward fuselage section and the tail fuselage section. The bay fuselage section has a pod receiving region. The pod receiving region has a pair of laterally disposed arcuate panels. The panels have windows. The windows of the panels are positioned to overlie the windows and doors of the pod during operation and use. The panels also have lower edges with hinges. The hinges are pivotably mounted to the sides of the airplane there beneath. The hinges are movable between an open orientation and a closed orientation. The open orientation allows for the lowering of a pod into the receiving region of the airplane from the pod loading and stacking structure. The closed orientation securely encompasses the pod. In this manner the pod is securely contained for takeoff and flight and landing.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining plural embodiments of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved passenger airplane container system which has all of the advantages of the prior art loading and unloading airplanes through known methods and apparatuses and none of the disadvantages.

It is another object of the present invention to provide a new and improved passenger airplane container system which may be easily and efficiently manufactured and marketed.

It is further object of the present invention to provide a new and improved passenger airplane container system which is of durable and reliable constructions.

An even further object of the present invention is to provide a new and improved passenger airplane container system which is susceptible of a low cost of manufacture with regard to both materials and labor, and which accordingly is then susceptible of low prices of sale to the consuming public, thereby making such passenger airplane container system economically available to the buying public.

Even still another object of the present invention is to provide a passenger airplane container system for allowing a passenger airplane to be loaded and unloaded in a safe and efficient manner.

Lastly, it is an object of the present invention to provide a new and improved passenger airplane container system comprises a pod. The pod has a hollow generally cylindrical configuration. The pod further has a horizontal divider. The horizontal divider separates the pod into a passenger area and a baggage area. An airplane is provided. The airplane has a central pod receiving region with a closure device. The closure device is movable between an open orientation and a closed orientation. The open orientation so allows for the lowering of a pod into the receiving region. The closed orientation securely encompasses the pod. In this manner the pod is securely contained for takeoff and flight and landing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
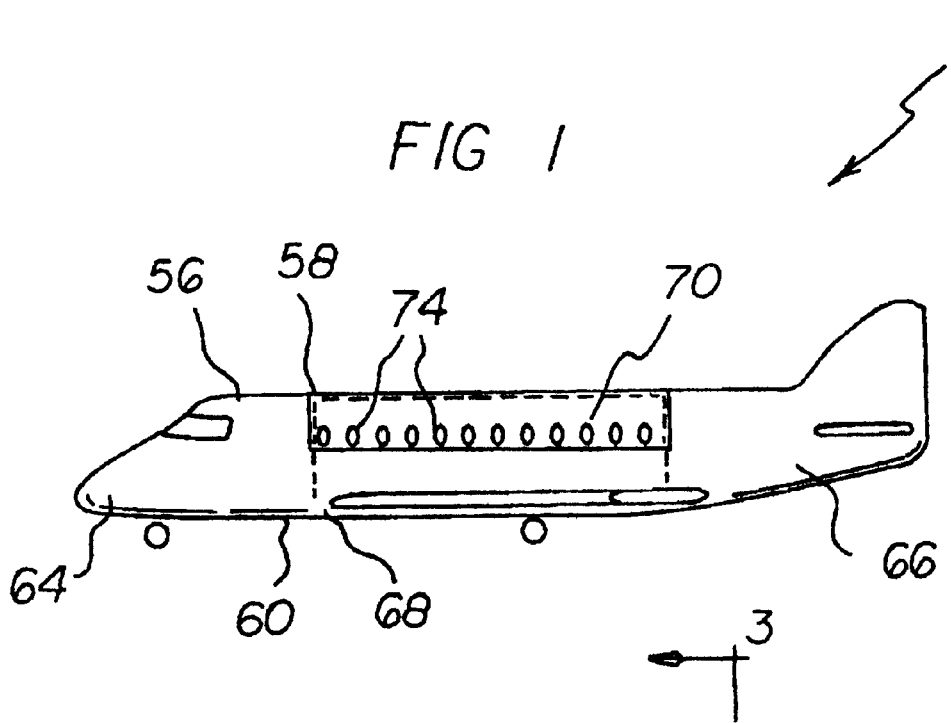
FIG. 1 is a side elevational view of the passenger airplane container system constructed in accordance with the principles of the present invention.
Figure 2:
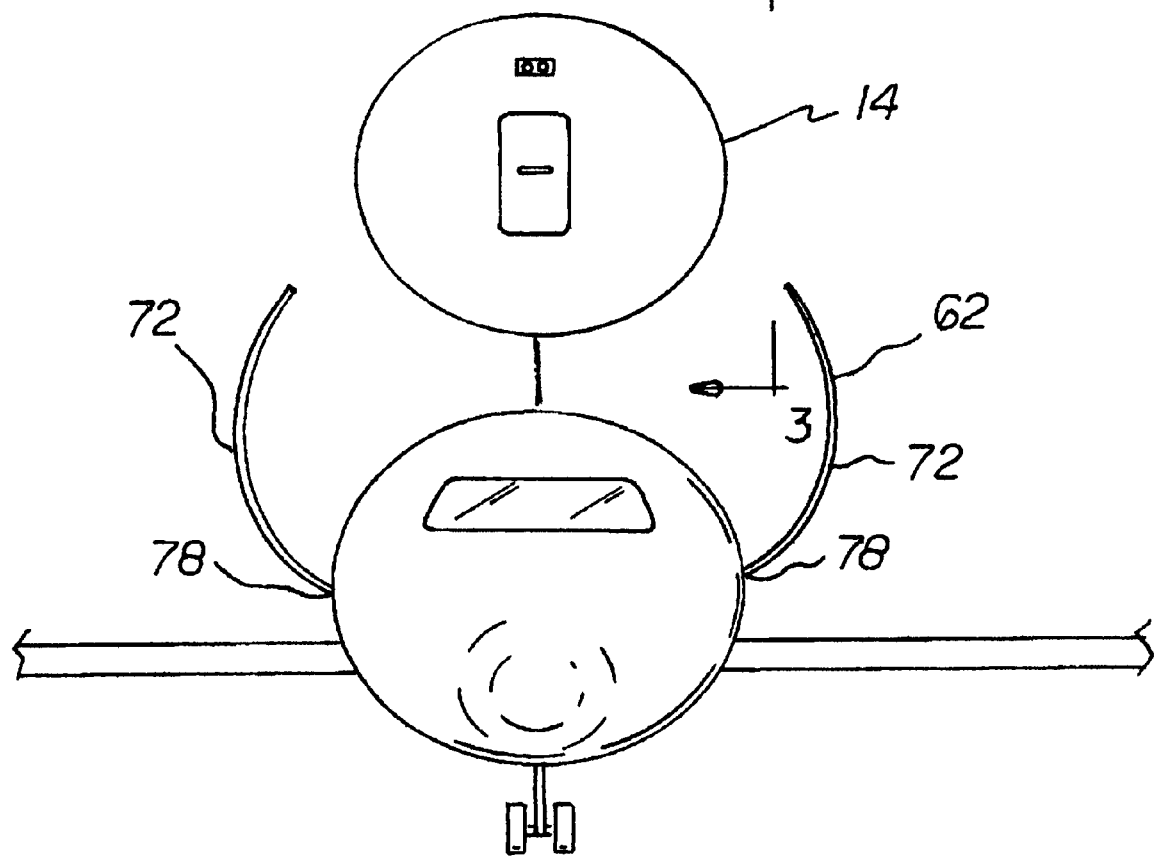
FIG. 2 is a front elevational view of the system shown in FIG. 1, but with the pod receiving panels open and the pod removed.
Figure 3:
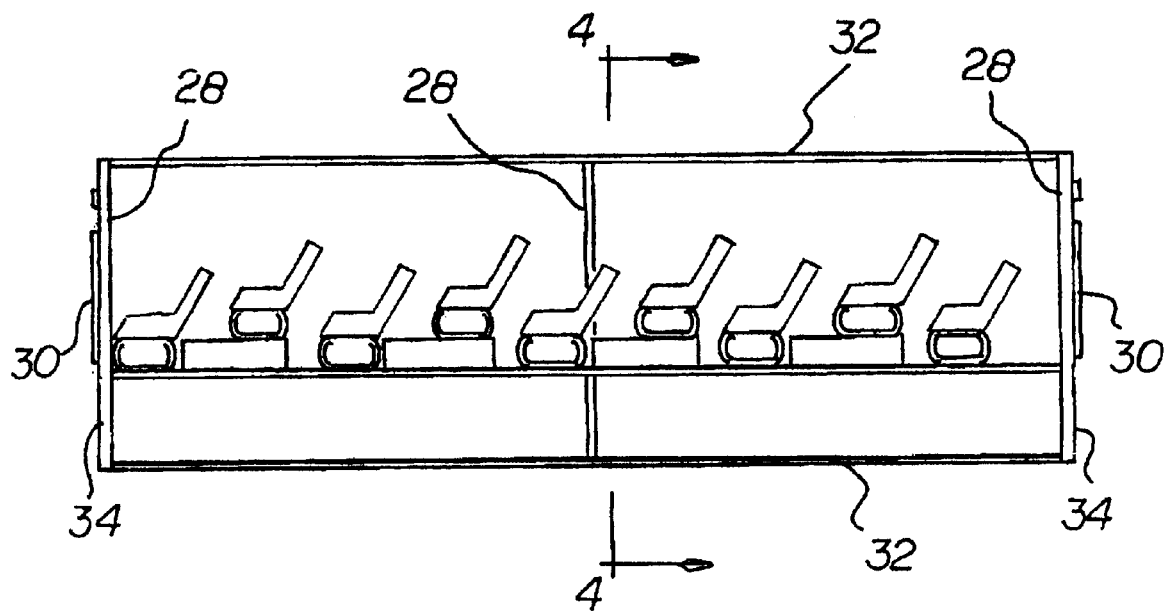
FIG. 3 is a side elevational view of the pod taken along line 3—3 of FIG. 2.
Figure 4:
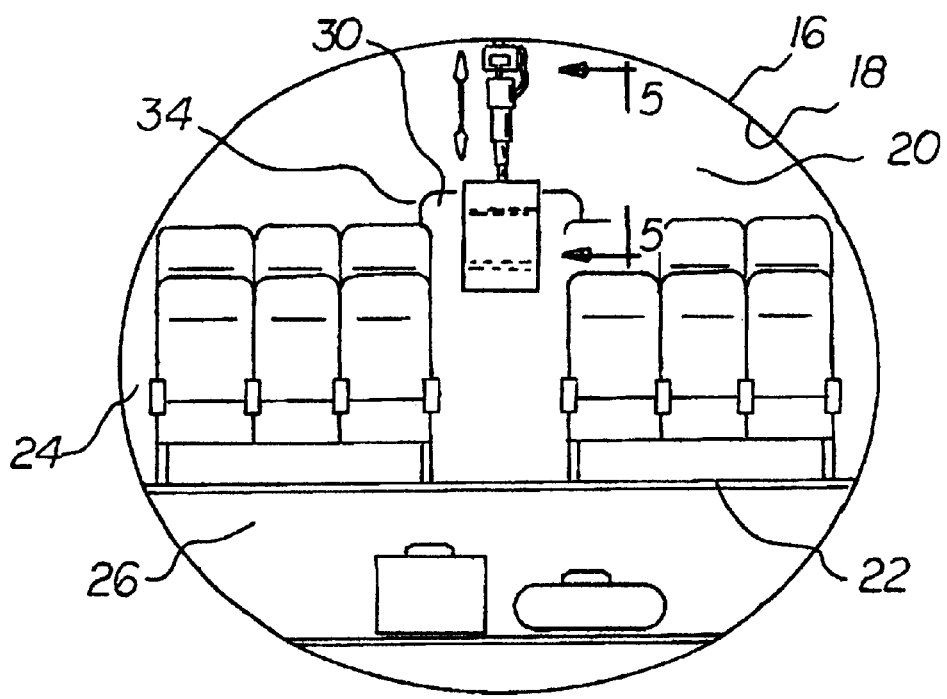
FIG. 4 is a cross-sectional view taken along line 4—4 of FIG. 3.
Figure 5:
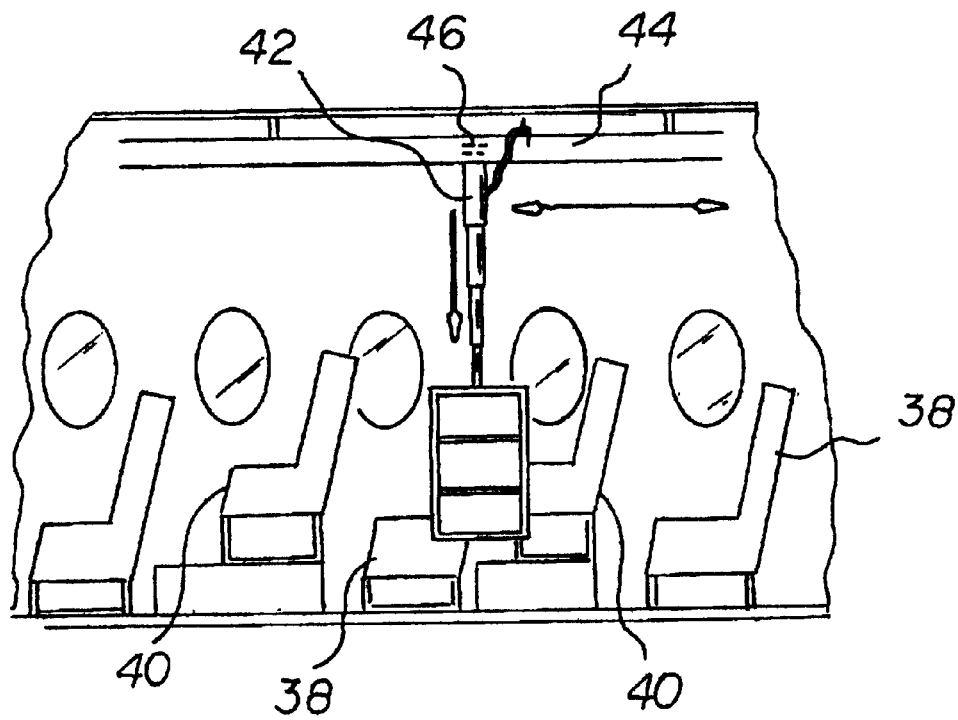
FIG. 5 is a cross-sectional view taken along line 5—5 of FIG. 4.
Figure 6:
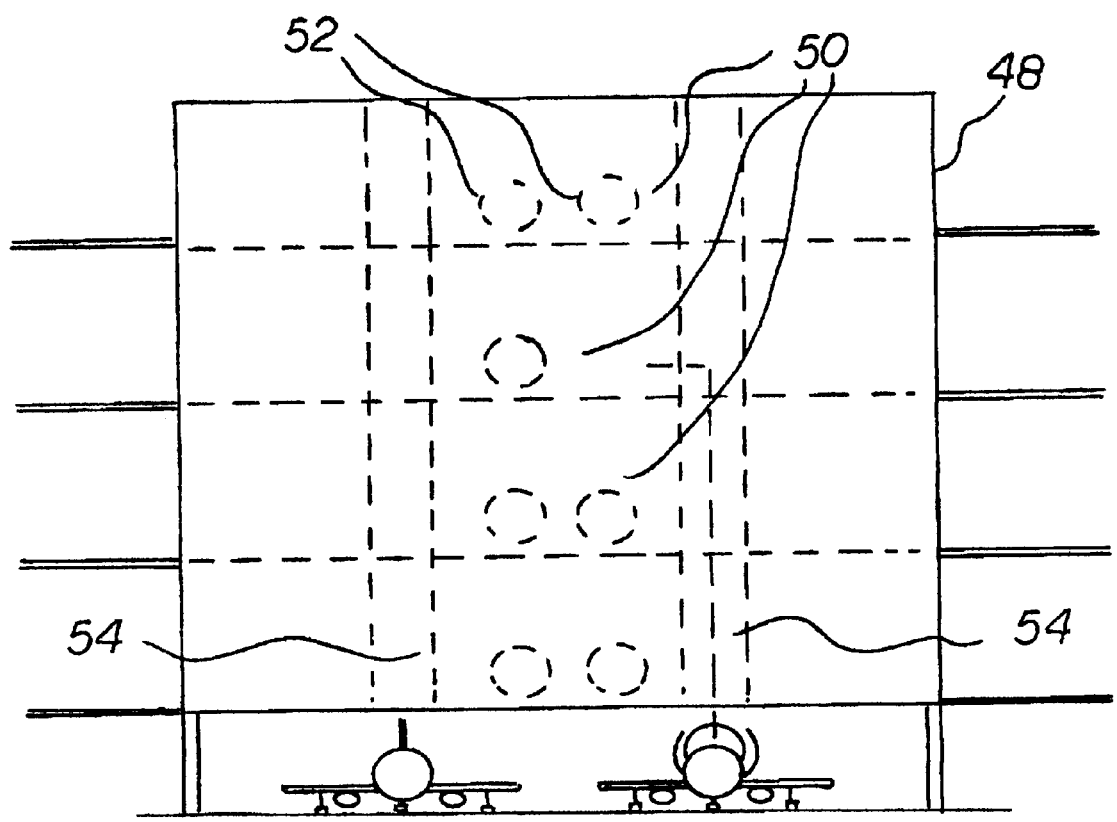
FIG. 6 is a front elevational view of a stacking structure and airplane in operative position with respect to each other in system configuration.

With reference now to the drawings, and in particular to FIG. 1 thereof, the preferred embodiment of the new and improved passenger airplane container system embodying the principles and concepts of the present invention and generally designated by the reference numeral 10 will be described.

The present invention, the passenger airplane container system 10 is comprised of a plurality of components. Such components in their broadest context include a pod and an airplane. Such components are individually configured and correlated with respect to each other so as to attain the desired objective.

First provided is a pod 14. The pod is fabricated of a rigid metallic material. The pod has a hollow generally cylindrical configuration. The pod also has an exterior surface 16 and an interior surface 18. The pod further has an enlarged chamber 20 within the interior surface. The pod has a horizontal divider 22. The horizontal divider separates the enlarged chamber into an upper passenger area 24 and a lower baggage area 26. The upper passenger area is within the chamber and above the divider. The lower baggage area 26 is within the chamber and below the divider. These could be reversed with passengers lower and baggage upper.

A plurality of passenger doors 30 is formed in the pod at the front and the back. The windows are doors are laterally spaced within the passenger area. The pod has two end covers 34 in which the doors are positioned. Each end cover has a door 36. The door is located in the center of the end covers.

To facilitate rapid passenger ingress and egress, each set of three seats in this example, or more for wider body aircraft, has open access from the side. This arrangement is similar to shuttle trams at theme parks. After landing and the pod is delivered to the terminal building, all passengers may disembark almost simultaneously. Similarly, baggage doors are on each side under each row of seats. Each bag stays with each passenger. In addition, the seats are preferably staggered up and down to provide more leg room and more seat recline area for comfort of all passengers.

The pod may be formed of cylindrical plates in a cylindrical configuration. The pod however is preferably formed of a plurality of axially aligned circular hoops 28 at the front and the rear and intermediate thereof. In addition, a plurality of horizontal rods 32 couple the hoops into a cage like structure.

The interior of the pod has a plurality of passenger seats 38 and 40. The seats are preferably positioned in rows with alternating rows at higher and lower elevations. This arrangement allows for greater comfort to the passengers. The interior of the pod further has a passenger walkway between the seats.

Provided next is a movable self-service module 42. The self-service module has an associated supporting track 44. The associated supporting track is on the uppermost extent of the pod in the passenger area. This arrangement allows passengers to help themselves to drinks and snacks. Coupling components are provided 46. The self-service module coupling components 46 are slidably mounted to the service module on the track. In this manner the service module is allowed to be moved along the length of the upper passenger area.

Next provided is a stacking structure 48. The stacking structure has a plurality of horizontal bays 50. Each bay is adapted to removably receive a pod. The passenger pods are loaded and unloaded with passengers and baggage. The stacking structure has a plurality of horizontal airplane parking zones 52. The horizontal airplane parking zones are beneath the horizontal bays. The stacking structure also has a plurality of vertical loading chutes 54. In this manner the raising and lowering of a pod between the horizontal bays and the parking zones is allowed.

The opening in the airplane could be at any access area such as the top or the bottom or the front or the rear. The loading chutes could thus be horizontal as well as vertical to facilitate use in alternative structures and airports, including present airports and regional airports and restricted airports.

Last provided is an airplane 56. The airplane has an upper surface 58 and a lower surface 60. The airplane also has two side surfaces 62. The airplane further has a forward fuselage section 64 and a rear tail fuselage section 66. A central bay fuselage section 68 is provided between the forward fuselage section and the tail fuselage section. The bay fuselage section has a pod receiving region 70. The pod receiving region has a pair of laterally disposed arcuate panels 72. The panels have windows 74 and doors 76. The windows of the panels are positioned to overlie the windows of the pod during operation and use. The panels also have lower edges with hinges 78. The hinges are pivotably mounted to the sides of the airplane there beneath. The hinges are movable between an open orientation and a closed orientation. The open orientation allows for the lowering of a pod into the receiving region of the airplane from the pod loading and stacking structure. The closed orientation securely encompasses the pod. In this manner the pod is securely contained for takeoff and flight and landing.

While the above describe embodiments disclose the stacking structure and the airplane parking zones and the loading chutes as being in proximity to each other, it should be understood they could be at varying distances separated from each other to facilitate their operations as a function of the particular application.

Figure 7:
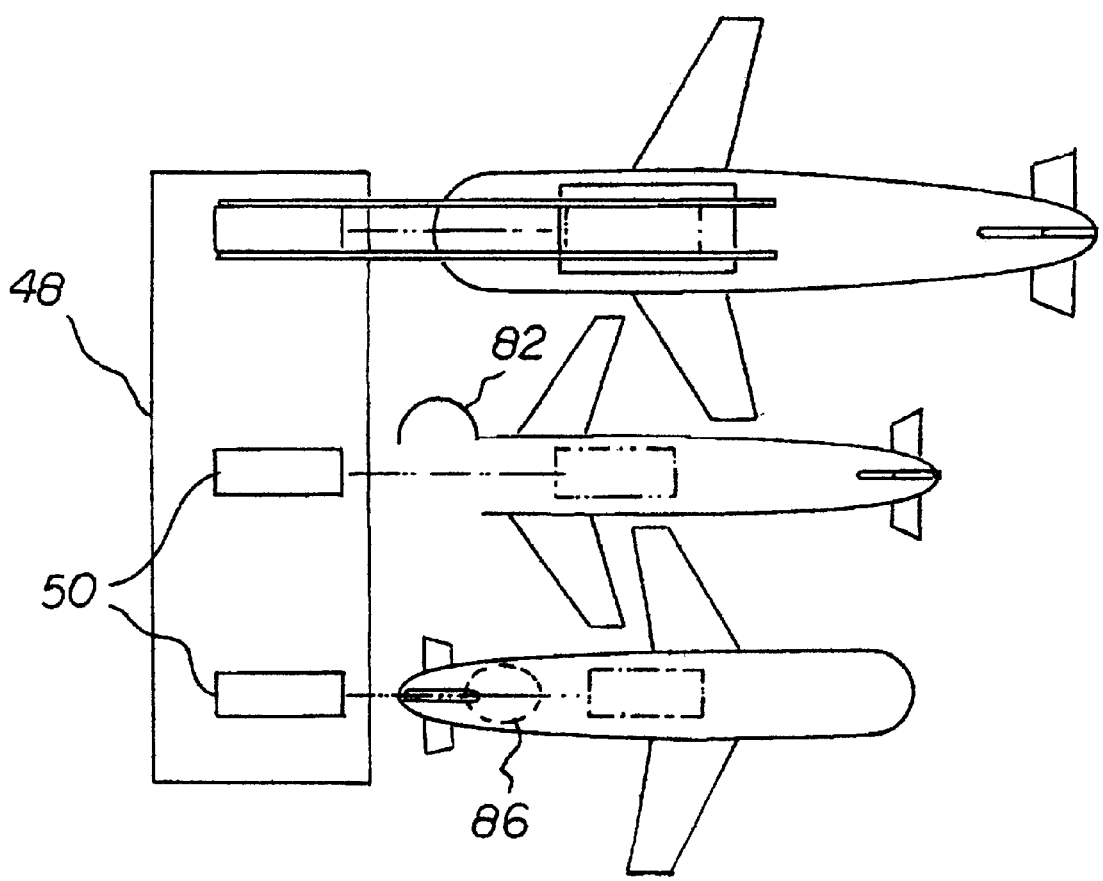
FIG. 7 is a top plan view of alternate embodiments of the invention.
Figure 8:
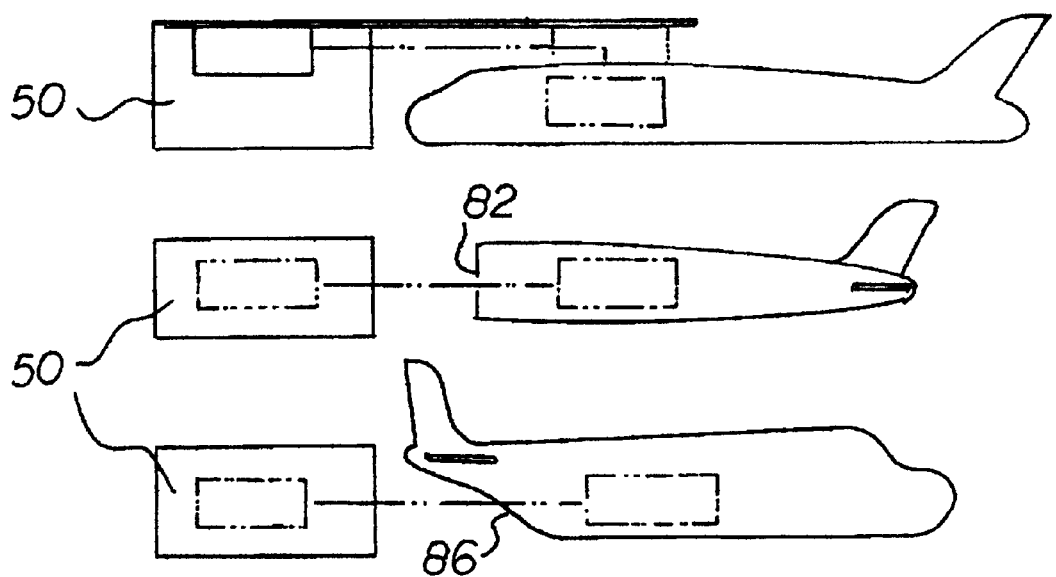
FIG. 8 are side elevational views of the embodiments shown in FIG. 7.

Alternate embodiments of the invention may be seen in FIGS. 7 and 8. FIG. 7 is a top view while FIG. 8 is a side elevational view of different airplanes receiving pods in different manners. In the top portions of FIGS. 7 and 8, the closure device is at the center of the airplane as in the above described embodiment. In the middle portions, the closure device 82 is at the front of the airplane. In the bottom portions, the closure device 84 is at the rear of the airplane.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A passenger airplane container system for allowing a passenger airplane to be loaded and unloaded in a safe and efficient manner comprising, in combination:

a pod fabricated of a rigid metallic material and having a hollow generally cylindrical configuration with an exterior surface and an interior surface and an enlarged chamber there within, the pod having a horizontal divider separating the enlarged chamber into an upper passenger area within the chamber above the divider and a lower baggage area within the chamber below the divider, a plurality of passenger windows formed in the pod laterally spaced within the passenger area, the pod having two end covers with each end cover having a door located in the center of the end covers, the interior of the pod having a plurality of passenger seats at alternating elevations and a passenger walkway between the seats;

a movable self-service module with an associated supporting track on the uppermost extent of the pod in the passenger area for allowing the passengers to help themselves to drinks and snacks, the self-service module coupling components slidably mounting the service module on the track to allow the service module to be moved along the length of the upper passenger area;

a stacking structure having a plurality of horizontal bays, each bay adapted to removably receive a pod while the passenger pods are being loaded and unloaded with passengers and baggage, the stacking structure having a plurality of horizontal airplane parking zones beneath the horizontal bays, and the stacking structure also having a plurality of vertical loading chutes to allow the raising and lowering of a pod between the horizontal bays and the parking zones; and an airplane having an upper surface and a lower surface and two side surfaces and with a forward fuselage section and a rear tail fuselage section and a central bay fuselage section between the forward fuselage section and the tail fuselage section, the bay fuselage section having a pod receiving region with a pair of laterally disposed arcuate panels, the panels having windows positioned to overlie the windows of the pod during operation and use, the panels also having lower edges with hinges pivotably mounted to the sides of the airplane there beneath and movable between an open orientation so as to allow the lowering of a pod into the receiving region of the airplane from the pod loading and stacking structure and a closed orientation securely encompassing the pod so as to securely contain the pod for takeoff and flight and landing.

2. A passenger airplane container system comprising:

a pod having a hollow generally cylindrical configuration with a horizontal divider separating the pod into an upper passenger area and a lower baggage area; and an airplane having a central pod receiving region with a pair of laterally disposed arcuate panels having lower edges with hinges and movable between an open orientation so as to allow the positioning of a pod into the receiving region and a closed orientation securely encompassing the pod so as to securely contain the pod for takeoff and flight and landing;

a stacking structure having a plurality of horizontal bays, each bay adapted to removably receive a pod while the passenger pods are being loaded and unloaded with passengers and baggage, the stacking structure having a plurality of horizontal airplane parking zones beneath the horizontal bays, and the stacking structure also having a plurality of vertical loading chutes to allow the raising and lowering of a pod between the horizontal bays and the parking zones.

3. The system as set forth in claim 2 and further including a movable self-service module with an associated supporting track on the uppermost extent of the pod in the passenger area for allowing the passengers to help themselves to drinks and snacks, the self service module coupling components slidably mounting the service module on the track to allow the service module to be moved along the length of the upper passenger area.

4. The system as set forth in claim 2 wherein the pod is formed of a plurality of axially aligned circular hoops and a plurality of horizontal rods coupling the hoops.

5. The system as set forth in claim 2 wherein the seats are positioned in rows with alternating rows at higher and lower elevations.

6. The system as set forth in claim 2 wherein the closure device is at the center of the airplane.

7. The system as set forth in claim 2 wherein the closure device is at the front of the airplane.

8. The system as set forth in claim 2 wherein the closure device is at the rear of the airplane.

9. The system as set forth in claim 2 wherein the passenger area has rows of seats with adjacent rows at different elevations.

* * * * *